United States Patent
Sinclair

(10) Patent No.: US 9,040,926 B2
(45) Date of Patent: May 26, 2015

(54) RUGGED SCINTILLATION CRYSTAL ASSEMBLY

(71) Applicant: CBG Corporation, Austin, TX (US)

(72) Inventor: Paul L. Sinclair, Austin, TX (US)

(73) Assignee: CBG Corporation, Austin, TX (US)

( * ) Notice: Subject to any disclaimer, the term of this patent is extended or adjusted under 35 U.S.C. 154(b) by 161 days.

(21) Appl. No.: 13/840,310

(22) Filed: Mar. 15, 2013

(65) Prior Publication Data
US 2014/0264042 A1    Sep. 18, 2014

(51) Int. Cl.
*G01T 1/202* (2006.01)

(52) U.S. Cl.
CPC ........................................ *G01T 1/202* (2013.01)

(58) Field of Classification Search
CPC ......... G01T 1/20; G01T 1/2002; G01T 1/202; G01T 1/2023
USPC .................... 250/361 R, 367, 370.01, 370.11
See application file for complete search history.

(56) References Cited

U.S. PATENT DOCUMENTS

| | | |
|---|---|---|
| 5,091,650 A | 2/1992 | Uchida et al. |
| 5,229,613 A | 7/1993 | Pandelisev et al. |
| 5,483,061 A | 1/1996 | Sloan |
| 6,534,771 B1 | 3/2003 | Rozsa |
| 7,550,729 B2 | 6/2009 | Hochstetler et al. |
| 2011/0042571 A1 | 2/2011 | Perna |

*Primary Examiner* — Mark R Gaworecki
(74) *Attorney, Agent, or Firm* — Campbell Stephenson LLP

(57) ABSTRACT

A rugged scintillation crystal assembly includes several scintillator crystals, which are optically coupled to each other by resilient optical-coupling material such as silicone pads and/or grease. The scintillator crystals are configured to collectively emit optical signals. Such a stack may combine the advantages of both a long form-factor for the overall assembly with the ruggedness of the assembly's component short crystals.

19 Claims, 2 Drawing Sheets

RUGGED SCINTILLATION CRYSTAL ASSEMBLY

FIELD OF THE INVENTION

This invention relates to the field of gamma radiation detection, and particularly to the use of scintillation crystals to detect gamma radiation.

DESCRIPTION OF THE RELATED ART

Scintillation crystals are used to detect gamma radiation by converting incident gamma photons into a short flash of light. The light pulse generated by the scintillation crystal can then be detected by a photomultiplier that is optically coupled to the crystal, and whose output is an electrical pulse that can be amplified and processed by associated electronic circuits. By counting these light pulses, the strength of the gamma radiation that caused the light pulses can be determined. A typical example of scintillator material is a single crystal of Sodium Iodide doped, or activated, with Thallium (i.e., a Sodium Iodide crystal into which impurities, in the form of Thallium, have been introduced).

A particular application of such radiation-detection means is in logging tools used to determine the natural radioactive properties of rock formations encountered by a borehole, typically while drilling in the search for oil or natural gas. The process is called logging while drilling (LWD) and can be used to determine the type of rock encountered by geologists skilled in the art. The data from the tool can be analyzed while drilling and employed to make informed decisions about how deep to drill a vertical well or for steering the drill-bit in directional-drilling operations. This process is known as geo-steering.

A radiation-detecting instrument of this kind is naturally subjected to extreme mechanical shock and vibration, even though it is normally encased in a strong metal housing with some shock-isolation means. At the same time, typical scintillator crystals are rather fragile. The result of this disparity is that the crystals often fracture during drilling operations, resulting in the drilling rig being required to shut down (a very expensive occurrence) so that the logging tool can be retrieved from the well in order to allow the scintillator crystal to be replaced. Furthermore, drilling technology advances, such as horizontal drilling and fast-drilling, have consistently increased the shock levels imposed on the crystals.

BRIEF DESCRIPTION OF THE DRAWINGS

A more complete understanding of the present invention may be acquired by referring to the following description and the accompanying drawings, in which like reference numbers indicate like features.

Figure 1:
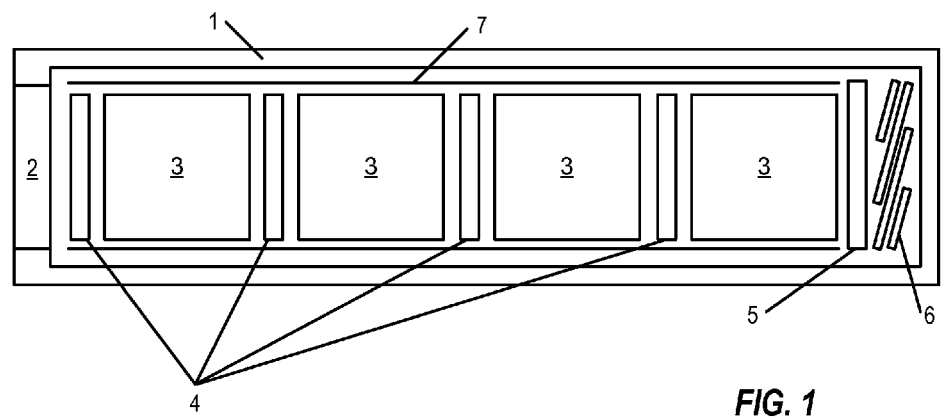
FIG. 1 illustrates a block diagram of a rugged scintillation crystal assembly, according to one embodiment of the invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Most crystals used in oil-well drilling are necessarily of an elongated cylindrical shape in order to fit within the borehole, which is itself an elongated cylinder. This form-factor unfortunately favors large bending moments under shock or vibration forces applied transversely to the long axis of the crystal. Invariably, the crystal will initially fracture in the transverse direction, and the fracture will rapidly spread through the majority of the single crystal due to the nature of these materials, resulting in a multitude of light-reflecting surfaces which scatter and absorb light that would otherwise exit through a window to a photomultiplier. At this point, a normal crystal would need to be replaced.

Crystals that have a short form-factor, or near spherical (or short cylinder) shape, are much more resistant to breakage both because transverse shock-induced bending moments are greatly reduced, and also because the natural self-resonant frequency of short structures is higher and therefore more easily damped. Unfortunately, longer crystals are needed in logging tools because the amount of naturally occurring radiation is quite low, the diameter of logging tools is limited by the size of drill-bit used to drill the borehole (as this determines the diameter of the borehole), and a greater volume of scintillator is needed to intercept enough of the otherwise low naturally occurring radiation to provide an accurate measurement of the radioactivity in the formation surrounding the borehole.

Breakage usually occurs because side-loads on the cylindrical crystal cause tensile stresses near the central part of the long axis. The area moment of inertia I for a solid cylinder is given by:

$$I = \pi R^4/4,$$

where R=the radius of the cross-section.

The maximum tensile stress S at the outer fiber of the cylindrical crystal due to a bending moment that occurs while both ends of the crystal are supported, which is the typically manner in which crystals are installed in logging tools, is:

$$S = M*R/I,$$

where M=bending moment $$M = P*L/4,$$

where P=force applied at the center and L=crystal length
Putting these equations together:

$$S = P*L/(\pi R^3)$$

If the applied force is due to the mass of the crystal itself with an applied external acceleration of A, and the density of the crystal material is D, then the force:

$$P = \pi R^2 L * A * D/4$$

Finally, the peak tensile stress is:

$$S = A*D*L^2/4R$$

Thus, the stress is proportional to the square of the length and inversely proportional to the radius, so it is very advantageous to make the crystal length shorter while increasing the radius. Unfortunately, the detection efficiency of the crystal is increased by using a high-density material, and single-crystal material is particularly subject to fracture propagation once initiated. When the length of the crystal is increased, which—as already explained above—is needed in logging tools used in boreholes, the problem is compounded.

FIG. 1 shows an example of a rugged scintillation crystal assembly formed by coupling several short crystals together in a stack. Such a stack combines the advantages of both a long form-factor for the overall assembly with the ruggedness of its component short crystals. The short crystals are coupled in a way that increases the light transmission through the interfaces, which would otherwise be similar to a fracture in a single elongated crystal, while also allowing some relative motion at the interfaces to absorb applied shocks.

As shown in FIG. 1, the rugged scintillation crystal assembly is enclosed in a casing 1. In this example, the casing 1 is made of metal such as a Titanium alloy. Such a casing could be designed to fit within a LWD tool, such as that shown in FIG. 2, designed for usage in a borehole. For example, the casing can be designed as a thin-wall cylinder.

The metal casing 1 includes an optical window 2 that allows the light pulses emitted by the stack of scintillator crystals to be output to a light-measuring device such a photomultiplier. This window 2 is made of a material, such as a Sapphire disc, that allows the optical transmission of light pulses from inside the casing 1 to a device outside of the casing. The metal casing 1 and window 2 can form a hermetically-sealed package that protects the crystals from being exposed to moisture or other contaminants.

The actual stack of scintillator crystals is made up of a set of four 1"×1" (25.4 mm×25.4 mm) crystals 3. These crystals 3 are separated from each other and from window 2 by optical interface pads 4. These optical interface pads 4 allow the crystals 3 to be optically coupled to each other and to the window 2, while at the same time absorbing at least some of the stresses being applied to the assembly. While four crystals are shown in this example, other embodiments may use different numbers of (and sizes of) crystals to form the stack of crystals for use within a rugged scintillation crystal assembly.

A pusher plate 5 and compression spring 6, located at the opposite end of the assembly as the optical window 2, apply a force that keeps the crystals 3 and optical interface pads 4 in physical and optical contact with each other. A containment sleeve 7 surrounds the crystals 3 and optical interface pads 4 within the metal casing 2.

In one embodiment, any remaining gaps between the optical interface pads 4 and crystals 3 within containment sleeve 7 can be filled with a substance (not shown), such as a silicone grease, that provides optical coupling between the crystals 3.

In one embodiment, optical interface pads 4 are thin, flexible silicone-rubber pads. These pads (and any accompanying grease) can be selected based upon their optical transmission capabilities. When both pads and grease are used, these two materials can be selected to have optical properties that match each other. For example, the BC-637 optically-clear pad and BC-630 optically-clear grease, both available from Saint-Gobain Crystals of Hiram, Ohio, USA, are both described as transmitting at least 90% of the incident light. In some embodiments, only pads (or only grease) may be used instead of a combination of both pads and grease. Additionally, other materials that are capable of optically coupling the crystals while also providing some shock absorption may be used instead of the pads and grease shown in FIG. 1. In general, the coupling and shock absorbing material should be resilient and/or elastic, at least to a greater degree than the crystals, and preferably enough to absorb a substantial amount of the shocks expected to be encountered by the scintillation crystal assembly during normal operation.

In one embodiment, each short section of crystal 3 will have a form factor, defined in terms of length L and radius R, that is defined as follows:

$$L/2R \approx 1$$

While in some instances it may be possible to achieve a form factor of exactly one (at least to a particular degree of certainty), other instances may only approximate one (e.g., within a 10% margin of manufacturing error).

If 90% of the light is transmitted at each interface between the crystals 3 by the combination of the pads 4 (and any grease, if used), then the useful amount of light from the crystal 3 furthest from the window is $(0.9)^4$, from the next nearest is $(0.9)^3$, and so on. The total amount of light recovered from the combination is therefore:

$$\text{Relative light output} = 0.25(0.9)^4 + 0.25(0.9)^3 +$$
$$0.25(0.9)^2 + 0.25(0.9)$$
$$= 0.774$$

This is to be compared to the relative light output of a single 1 inch diameter by 4 inch (25.4 mm×101.6 mm) long crystal, with a single interface at the window, giving a relative efficiency of:

$$\text{Efficiency} = 0.774/0.9 = 86\%$$

In practice, the coupling efficiency may be higher (e.g., if the pads and/or grease or other coupling material transmits more of the incident light than indicated by its manufacturer), but in many environments, an 86% efficiency is a small price to pay (in lost gamma signal) for a greatly improved lifetime. Depending on the environment, greater or lesser reductions in efficiency may be acceptable, and thus the efficiency of the coupling material can be selected to be greater or lesser than that described herein, depending upon the constraints of the application at hand.

Additionally, a set of several smaller crystals may be more inexpensive to manufacture (and consequently purchase) than a corresponding single crystal of the same relative length. This reduction in savings may offset the cost of any additional components such as extra pads, grease, springs, and the like. Thus, in addition to potentially improving the ruggedness of the scintillation crystal assembly, the use of a stack of crystals like that shown in FIG. 1 may also reduce the cost of the assembly.

Some types of crystals are unavailable in the long form-factors used in traditional scintillator applications, due to manufacturing and/or cost constraints. For example, the BrilLanCe 380™ from Saint Gobain is currently only available in a short form factor. Thus, without using the present invention to incorporate multiple short form-factor crystals into an optically coupled assembly that effectively provides a longer form factor, such crystals would not be available for use in applications that required longer form factors.

While FIG. 1 has been described in the context of a particular type of crystal and a particular packaging technique, the concepts of FIG. 1 can be applied to other types of crystals and/or packaging. Additionally, there are uses for a rugged scintillation crystal assembly in many contexts, in addition to the context of LWD described herein.

Figure 2:
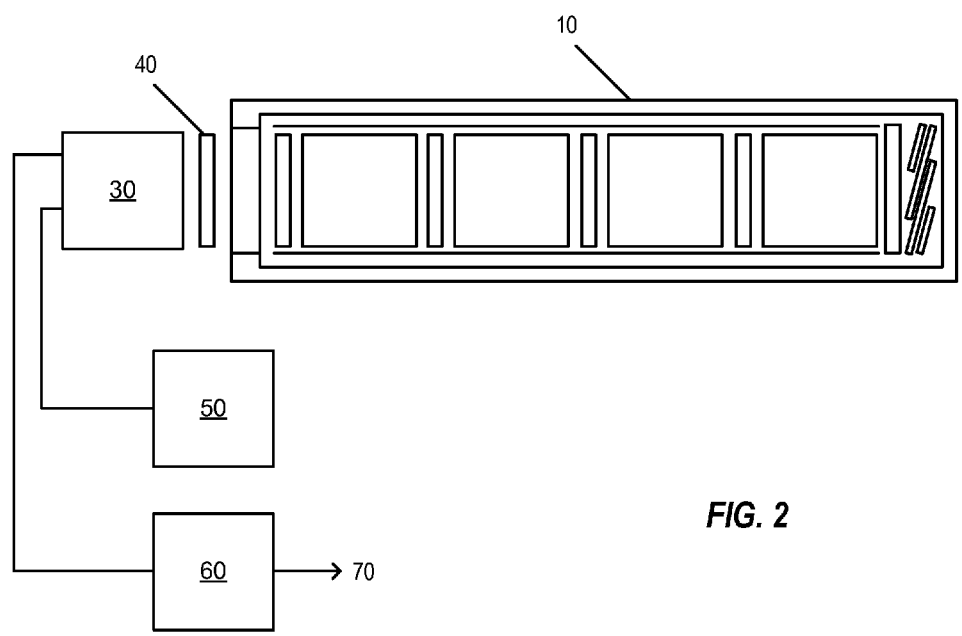
FIG. 2 illustrates a block diagram of a logging tool that includes a rugged scintillation crystal assembly, according to one embodiment of the invention.

FIG. 2 shows an example of a LWD tool that includes a rugged scintillation crystal assembly like that shown in FIG. 1. As shown, the LWD tool includes a rugged scintillation assembly 10, which is optically coupled, by an optical interface pad 40 in this example, to a photomultiplier 30. The optical interface pad 40 can be the same type of (or at least optically matched to) pad that is used internally within assembly 10 in some embodiments.

The photomultiplier 30 is powered by power supply 60 (e.g., a high-voltage bias supply). Photomultiplier 30 is configured to detect light pulses that are generated within assembly 10 and output via the optical window within the metal casing of the assembly 10. Photomultiplier 30 then outputs an electrical signal (e.g., an electrical current) that represents each pulse of light emitted by assembly 10.

The electrical signal output from photomultiplier 30 is input to signal processing circuitry 60, which can process the signal (e.g., by amplifying, filtering, and/or converting the signal to a digital signal) to produce an output pulse signal 70.

The LWD tool of FIG. 2 can be housed in a rugged metal pipe that is designed to be used as a special purpose drill collar, or "sub." Such a drill collar that can be placed near the drill bit within a drillstring being used to drill a borehole for use, for example, oil and gas development. The LWD tool can also include or be coupled to telemetry or other communication equipment to transmit output, such as signal 70 or signals derived from signal 70, to the earth's surface.

Figure 3:
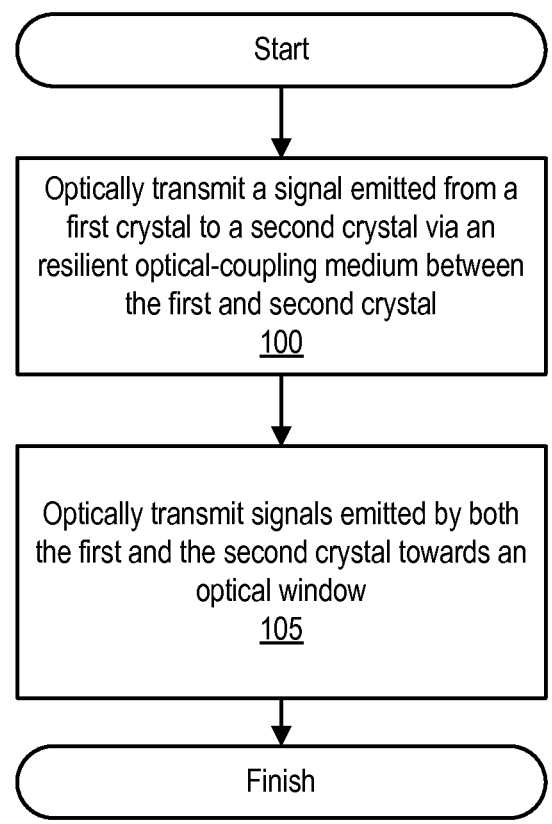
FIG. 3 is a flowchart of a method of operating a rugged scintillation crystal assembly, according to one embodiment of the present invention.

FIG. 3 is a method of operating a rugged scintillation crystal assembly that includes at least two crystals. As shown, the method begins by optically transmitting an optical signal emitted within one crystal to another crystal within the assembly, as shown at 100. The optical signal is transmitted via a resilient optical coupling medium that is physically located between the first and second crystal. This medium can include an optical coupling pad and/or grease as described above, or any other suitable material that is both able to provide suitable optical coupling and physical flexibility and/or resilience in order to absorb at least some of the shocks applied to the assembly. The first and second crystals may have a relatively short form factor (e.g., approximately 1). Operation 100 can be repeated for each subsequent crystal within the assembly, with each crystal transmitting the optical signals (if any) emitted by neighboring crystal(s) towards an optical window.

At 105, optical signals originating from both the first and the second crystals are then transmitted towards an optical window in a casing housing the two crystals. Accordingly, a given crystal within the assembly will transmit both signals emitted by that crystal and signals received from neighboring crystals towards the optical window. Thus, in operation, the stack of two (or more) crystals operate in conjunction, approximately as if the stack of crystals were a single crystal with a form factor of N*X, where N is the number of crystals optically coupled by resilient material within the assembly, and where X is the form factor of each of those N crystals.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A system comprising:
  a casing for use in a logging-while-drilling tool;
  an optical window within the casing, wherein the optical window is configured to transmit an optical signal emitted within the casing to a device outside of the casing;
  a plurality of scintillator crystals within the casing, wherein the plurality of scintillator crystals are optically coupled to each other by resilient optical-coupling material, and wherein the plurality of scintillator crystals are configured to collectively emit optical signals to the optical window.

2. The system of claim 1, further comprising a light-detecting device coupled to detect optical signals emitted from the optical window.

3. The system of claim 1, wherein at least one of the plurality of scintillator crystals is cylindrically shaped with a length L and a radius R, and wherein L/2R of the at least one of the plurality of scintillator crystals is approximately one (1).

4. The system of claim 1, wherein the resilient optical-coupling material comprises one or more silicone pads, wherein the one or more silicone pads optically couple the plurality of scintillator crystals and physically isolate the plurality of scintillator crystals from each other.

5. The system of claim 1, wherein the resilient optical-coupling material comprises silicone grease surrounding the plurality of scintillator crystals.

6. The system of claim 1, wherein the wherein the resilient optical-coupling material is configured to transmit at least 90% of incident light.

7. The system of claim 1, wherein at least one of the plurality of scintillator crystals is cylindrically shaped.

8. The system of claim 7, wherein all of the plurality of scintillator crystals are cylindrically shaped.

9. The system of claim 1, wherein at least one of the plurality of scintillator crystals is cylindrically shaped with a length L and a radius R, and wherein L/2R of the at least one of the plurality of scintillator crystals is less than or equal to two (2).

10. A method comprising:
  emitting a first optical signal, wherein the emitting is performed by a first scintillator crystal;
  receiving a second optical signal emitted by a second scintillator crystal, wherein the receiving is performed by the first scintillator crystal, wherein the optical signal is received via a resilient optical-coupling material, and wherein the resilient optical-coupling material is located between the first scintillator crystal and the second scintillator crystal; and
  optically transmitting the first optical signal and the second optical signal towards an optical window within a casing of a logging-while-drilling tool, wherein the casing houses the first scintillator crystal and the second scintillator crystal, and wherein the optically transmitting is performed by the first scintillator crystal.

11. The method of claim 10, further comprising receiving a plurality of optical signals, including the first and second optical signals, via the optical window, wherein the receiving the plurality of signals is performed by a light-detecting device.

12. The method of claim 10, wherein the first and second scintillator crystals are cylindrically shaved, wherein the first scintillator crystal has a length L1 and a radius R1, wherein the second scintillator crystal has a length L2 and a radius R2, wherein L1/2R1 and L2/2R2 of the first scintillator crystal and the second scintillator crystal, respectively, are approximately one (1).

13. The method of claim 10, wherein the resilient optical-coupling material comprises a silicone pad.

14. The method of claim 10, wherein the resilient optical-coupling material comprises silicone grease.

15. The method of claim 10, wherein the resilient optical-coupling material is configured to transmit at least 90% of incident light.

16. The method of claim 10, wherein the emitting, the receiving, and the optically transmitting are performed during operation of a logging-while-drilling tool, wherein the logging-while-drilling tool comprises the first and the second scintillator crystal.

17. The method of claim 10, wherein the first scintillator crystal is cylindrically shaped.

18. The system of claim 17, wherein the second scintillator crystal is cylindrically shaped.

19. The method of claim 10, wherein the first and second scintillator crystals are cylindrically shaped, wherein the first scintillator crystal has a length L1 and a radius R1, wherein the second scintillator crystal has a length L2 and a radius R2, wherein L1/2R1 and L2/2R2 of the first scintillator crystal and the second scintillator crystal, respectively, are less than or equal to two (2).

* * * * *